US011165118B2

(12) United States Patent
Wuensche et al.

(10) Patent No.: US 11,165,118 B2
(45) Date of Patent: Nov. 2, 2021

(54) BATTERY SYSTEM HAVING A PLURALITY OF TRAVERSES AND VEHICLE INCLUDING SAME

(71) Applicants: SAMSUNG SDI CO., LTD., Yongin-si (KR); Irena Stojanovic, Raaba-Grambach (AT)

(72) Inventors: Ralph Wuensche, Graz (AT); Oliver Stojanovic, Hausmannstaetten (AT); Horst Krieger, St. Johann i. S. (AT); Nikolaus Hochgatterer, Graz (AT); Werner Amreich, Voitsberg (AT)

(73) Assignee: SAMSUNG SDI CO., LTD., Yongin-si (KR)

( * ) Notice: Subject to any disclaimer, the term of this patent is extended or adjusted under 35 U.S.C. 154(b) by 175 days.

(21) Appl. No.: 16/474,002

(22) PCT Filed: Dec. 13, 2017

(86) PCT No.: PCT/KR2017/014626
§ 371 (c)(1),
(2) Date: Jun. 26, 2019

(87) PCT Pub. No.: WO2018/128295
PCT Pub. Date: Jul. 12, 2018

(65) Prior Publication Data
US 2021/0129684 A1     May 6, 2021

(30) Foreign Application Priority Data

Jan. 4, 2017     (EP) ...................................... 17150260
Dec. 12, 2017   (KR) ......................... 10-2017-0170680

(51) Int. Cl.
*B60K 1/04*       (2019.01)
*H01M 50/20*    (2021.01)
(Continued)

(52) U.S. Cl.
CPC ............... *H01M 50/20* (2021.01); *B60K 1/04* (2013.01); *B60L 50/60* (2019.02); *B60L 50/64* (2019.02);
(Continued)

(58) Field of Classification Search
CPC .............................. B60K 1/04; H01M 10/613
See application file for complete search history.

(56) References Cited

U.S. PATENT DOCUMENTS 6,042,961 A * 3/2000 Verhoog ............. H01M 10/647
429/72
6,094,927 A * 8/2000 Anazawa ................ B60L 58/26
62/239

(Continued)

FOREIGN PATENT DOCUMENTS

CN     102576831 A     7/2012
CN     204011533 U    12/2014
(Continued)

OTHER PUBLICATIONS

European Patent Office Action for corresponding European Patent Application No. 17 150 260.2, dated Jan. 16, 2020, 5 pages.
(Continued)

*Primary Examiner* — John D Walters
*Assistant Examiner* — James J Triggs
(74) *Attorney, Agent, or Firm* — Lewis Roca Rothgerber Christie LLP (57) ABSTRACT

According to an exemplary embodiment of the present invention, a battery system includes: a system frame configured to include a pair of first frame beams that extend in a first direction and a pair of second frame beams that extend in a second direction perpendicular to the first direction and that are connected to the first frame beams; a plurality of traverses spaced apart in the first direction and coupled to the
(Continued)

pair of first frame beams; and a plurality of battery modules respectively coupled to at least one of the traverses and each including a plurality of battery cells arranged in the second direction, wherein the pair of first frame beams includes a plurality of coolant supply lines, and at least one of the traverses is connected to the coolant supply lines.

14 Claims, 10 Drawing Sheets

(51) Int. Cl.
| | |
|---|---|
| *B60L 50/64* | (2019.01) |
| *H01M 10/613* | (2014.01) |
| *H01M 10/625* | (2014.01) |
| *H01M 10/653* | (2014.01) |
| *H01M 10/6557* | (2014.01) |
| *B60L 50/60* | (2019.01) |
| *H01M 50/249* | (2021.01) |
| *H01M 50/209* | (2021.01) |
| *H01M 50/244* | (2021.01) |
| *H01M 50/271* | (2021.01) |

(52) U.S. Cl.
CPC ....... *H01M 10/613* (2015.04); *H01M 10/625* (2015.04); *H01M 10/653* (2015.04); *H01M 10/6557* (2015.04); *H01M 50/209* (2021.01); *H01M 50/244* (2021.01); *H01M 50/249* (2021.01); *H01M 50/271* (2021.01); *B60K 2001/0438* (2013.01); *H01M 2220/20* (2013.01)

(56) References Cited

U.S. PATENT DOCUMENTS

| | | | | |
|---|---|---|---|---|
| 6,840,050 | B2 * | 1/2005 | Pode | H01M 10/663 |
| | | | | 62/3.61 |
| 7,531,269 | B2 * | 5/2009 | Wegner | H01M 10/613 |
| | | | | 429/120 |
| 7,560,190 | B2 * | 7/2009 | Ahn | H01M 10/647 |
| | | | | 429/120 |
| 7,810,596 | B2 * | 10/2010 | Tsuchiya | H01M 10/613 |
| | | | | 180/68.5 |
| 7,846,573 | B2 * | 12/2010 | Kelly | H01M 50/20 |
| | | | | 429/120 |
| 9,919,591 | B2 * | 3/2018 | Mizoguchi | B60L 50/66 |
| 2009/0197154 | A1 * | 8/2009 | Takasaki | H01M 50/20 |
| | | | | 429/83 |
| 2011/0206948 | A1 | 8/2011 | Asai et al. | |
| 2012/0224326 | A1 | 9/2012 | Kohlberger et al. | |
| 2013/0266840 | A1 | 10/2013 | Fujii et al. | |
| 2015/0270516 | A1 | 9/2015 | Mcleskey et al. | |
| 2016/0133999 | A1 | 5/2016 | Lee et al. | |
| 2017/0012268 | A1 | 1/2017 | Watanabe | |
| 2017/0012330 | A1 | 1/2017 | Kim et al. | |
| 2018/0026243 | A1 | 1/2018 | Stojanovic et al. | |

FOREIGN PATENT DOCUMENTS

| | | |
|---|---|---|
| CN | 105247729 A | 1/2016 |
| DE | 10 2011 107 007 A1 | 1/2013 |
| EP | 2 991 134 B1 | 3/2016 |
| EP | 3 273 500 A1 | 1/2018 |
| JP | 2011 198688 A | 10/2011 |
| JP | 2012-94370 A | 5/2012 |
| JP | 2012-138205 A | 7/2012 |
| JP | 5137480 B2 | 2/2013 |
| JP | 2015-138647 A | 7/2015 |
| KR | 10-2011-0097666 A | 8/2011 |
| KR | 10-2012-0096133 A | 8/2012 |
| WO | WO 2015/126209 A1 | 8/2015 |

OTHER PUBLICATIONS

European Office action issued in corresponding application EP 17 150 26.2, dated Dec. 10, 2020, 4 pages.
Extended European Search Report of corresponding EP 17150260.2-1360, dated Apr. 5, 2017, 7 pages.
Chinese Office action and Search Report issued in corresponding application No. CN 201780081803.6, dated Jul. 2, 2021, 18 pages (with English Translation).

* cited by examiner

BATTERY SYSTEM HAVING A PLURALITY OF TRAVERSES AND VEHICLE INCLUDING SAME

CROSS-REFERENCE TO RELATED APPLICATIONS

This application is a National Phase Patent Application and claims priority to and the benefit of International Patent Application Number PCT/KR2017/014626, filed on Dec. 13, 2017, which claims priority of European Patent Application No. 17150260.2, filed on Jan. 4, 2017, and Korean Patent Application No. 10-2017-0170680, filed on Dec. 12, 2017, the entire contents of all of which are incorporated herein by reference.

TECHNICAL FIELD

The present invention relates to a battery system and a vehicle including the battery system.

BACKGROUND ART

A rechargeable battery differs from a primary battery in that it can repeatedly perform charging and discharging, and the primary battery only performs non-reversible conversion from chemical energy into electrical energy.

A low-capacity rechargeable battery is used as a power source for small electronic devices such as portable telephones, laptops computers, and camcorders, and a high-capacity rechargeable battery is used as a power source for vehicles.

In general, the rechargeable battery may include an electrode assembly including a positive electrode, a negative electrode, and a separator interposed between the positive electrode and the negative electrode, a case for accommodating the electrode assembly therein, and an electrode terminal electrically connected to the electrode assembly. An electrolyte solution is injected to enable charging and discharging of the battery through an electrochemical reaction of a positive electrode, a negative electrode, and the electrolyte solution. The case, which has, e.g., a cylindrical shape or a rectangular shape, may have a shape that is different depending on the use of the battery.

The rechargeable battery may be used as a battery module that is formed to include a plurality of unit battery cells connected in series and/or in parallel, thereby providing a battery of high energy density, e.g., a battery for driving a motor of a hybrid vehicle. That is, the battery module is formed by interconnecting electrode terminals of a plurality of unit cell cells depending on an amount of power required to implement a rechargeable battery of high power, e.g., a rechargeable battery for an electric vehicle.

The battery module may be configured in a block design or a module design. In the case of the block design, each battery cell is connected to a common current collector structure and a common battery management system (BMS). In the case of the module design, a plurality of battery cells are connected to constitute a submodule, and some of such submodules are connected to constitute the battery module. A battery management function may be implemented at a module or submodule level, thereby improving compatibility.

These battery modules may be equipped with a thermal management system in a mechanically and electrically integrated state, and may be configured to communicate with one or more electrical consumers to constitute a battery system.

The submodules, each of which includes a plurality of battery cells connected in parallel to each other, are connected to each other in series (XsYp), or the submodules, each of which includes a plurality of battery cells connected to each other in series, are connected in parallel (XpYs), in order to provide an electrically integrated battery system in the module design. The XsYp type submodules are suitable for generating high voltages, but a voltage level of each of the battery cells must be individually controlled, thereby increasing wiring complexity. In the XpYs type submodules, voltage levels of all the cells connected in parallel are automatically balanced. Thus, it is sufficient to control the voltage at the submodule level, thereby reducing the wiring complexity. Capacitances of the cells in the submodules of the parallel-connected battery cells are summed, so that the XpYs type of submodules are mostly used together with low capacity cells.

Static management of battery power output and discharge is not sufficient to satisfy the dynamic power demand of various electrical consumers connected to the battery system. Therefore, a constant exchange of information between the battery system and a manager of the electrical consumer is required, and this information includes important information such as actual state of charge (SoC) of the battery system, potential electrical performance, charging capability, and internal resistance, as well as actual or predicted power demand and surplus of the consumer. The battery system generally includes a battery management system (BMS) and a battery management unit (BMU) for processing such information.

A thermal management system for safely using a battery module by efficiently releasing, discharging, and/or dissipating heat generated from the rechargeable battery is required in order to manage the battery system. When the release/discharge/dissipation is not sufficiently performed, a temperature deviation occurs between the battery cells, so that at least one battery module cannot generate a desired amount of power. In addition, a temperature rise inside the battery module causes an abnormal reaction inside the battery module, thereby reducing charging/discharging performance of the rechargeable battery and shortening the cycle-life of the battery. Therefore, it is necessary to effectively release/discharge/dissipate heat from the battery cells to cool the battery cells. The mechanical integration of the battery system requires proper mechanical connection of individual components, e.g., a connection structure between the battery submodules in the battery system and electrical consumers such as vehicles.

In a conventional battery system, a cooling means is disposed between a pair of adjacent battery cells in a state where battery cells are vertically stacked. Accordingly, the conventional battery system includes an extension that is largely formed in a vertical direction, so that the battery system is generally increased in volume. In particular, in mobile devices, this battery system has the disadvantage of requiring a lot of installation space, and such a battery system is not suitable for mounting on a floor of an electric vehicle, for example.

DISCLOSURE

Technical Problem

One aspect of the present invention is to provide a battery system of a compact structure that can be mounted in a transport means such as an electric vehicle.

Technical Solution

An exemplary embodiment of the present invention relates to a battery system including a system frame including a pair of first frame beams and a pair of second frame beams.

The pair of first frame beams may extend in a first direction, and the pair of second frame beams may extend in a second direction perpendicular to the first direction. Herein 'perpendicular' may indicate a range between 85 and 95 degrees. Therefore, the system frame has a rectangular shape, and a plurality of traverses are assembled between the pair of first frame beams.

The traverses extend in the second direction, and the traverses may be spaced from each other by a predetermined distance based on the first direction. That is, two adjacent traverses are parallel, and have a lateral distance between them. The traverses are coupled to the pair of first frame beams so that the system frame is reinforced in strength and mechanical stability can be ensured.

Each battery module may include a plurality of battery cell arrays including a plurality of battery cells arranged in the second direction. In the battery cell arrays, the battery cells are arranged in the second direction, and electrode terminals of the respective battery cells may be oriented in the first direction or in a third direction that is perpendicular to the first direction and the second direction.

According to an exemplary embodiment of the present invention, the first frame beams may include a coolant supply line that is connected to an external coolant circuit, and at least one traverse or each of the traverses may include a coolant duct that is connected to the coolant supply line. Accordingly, a coolant may be supplied from an external coolant circuit to at least one coolant supply line of one of the first frame beams, and may flow into the coolant supply line of the same or the other first frame beam from the coolant supply line, to return to the coolant circuit.

According to an exemplary embodiment of the present invention, since cooling of the battery cells is performed through the traverses, a cooling means that may be disposed between the lower plate, the system cover, and adjacent battery cells may be omitted. Therefore, since the traverses can mechanically stabilize the system frame and simultaneously cool the battery cells, the battery system of a compact structure having a minimum height and a minimum installation space is provided.

According to an exemplary embodiment of the present invention, the coolant supply line may be integrally formed with each of the first frame beams, and the coolant duct may be integrally formed with at least one of the traverses.

According to this exemplary embodiment, the coolant pipe connected to the first frame beams or the traverses from the outside may be omitted, so that the space required for the installation of the battery system may be reduced. In addition, the coolant supply line and/or the coolant duct may be formed integrally with the first frame beams and the traverses, and thus the coolant, the battery cells, and the electrical connecting means may be properly separated to prevent malfunction.

According to an exemplary embodiment of the present invention, each of the traverses may include a first cross-section connected to a first frame beam A which is one of the pair of first frame beams, and a second cross-section connected to a first frame beam B which faces the first frame beam A. In other words, the first cross-section of each traverse is assembled to the first frame beam A of the pair of first frame beams, and the second cross-section is assembled to the first frame beam B which faces the first frame beam A to which the first cross-section is assembled.

According to this exemplary embodiment, a coolant distributor may be disposed in at least one of the first cross-section and the second cross-section. The coolant distributor disposed at each cross-section connects the coolant ducts included in the traverses to the coolant supply line integrally formed in each of the first frame beams. A plurality of coolant distributors disposed in at least one of the first cross-section and the second cross-section connect the coolant duct to a plurality of coolant supply lines integrally formed in the first frame beams.

According to an exemplary embodiment of the present invention, the pair of first frame beams and the pair of second frame beams may be welded together as extrusion profiles to form a rectangular-shaped system frame. In this case, when the first frame beams is an aluminum extrusion profile, a lightweight system frame may be easily manufactured.

According to an exemplary embodiment of the present invention, each of the battery cells may further include a bottom surface portion and a side portion perpendicularly connected to each end portion of the bottom surface portion According to this exemplary embodiment, at least one side portion of each battery cell is in thermal contact with the traverses, and thus the battery cells emit heat through the side portion.

According to an exemplary embodiment of the present invention, each of the battery cells may include a bottom surface portion, a pair of first side surface portions, and a pair of second side surface portions. The first side surface portions and the second side surface portions extend perpendicularly from the respective end portions of the bottom surface portion, and a width of the second side surface portions is smaller than that of the first side surface portions.

According to an exemplary embodiment of the present invention, each of the traverses may extend in the second direction to be in thermal contact with the second side surface portions, and according to this exemplary embodiment, the second side portions are oriented in the first direction. In other words, since the first side surface portions of adjacent battery cells are arranged to face each other, the battery cells are packed at a high density, and the arranged battery cells are cooled through the second side surface portions.

According to an exemplary embodiment of the present invention, in a battery system, the traverses may be spaced from each other by a distance corresponding to the width of the first side surface portions with respect to the second direction. In other words, one battery cell array may be disposed between two adjacent traverses, thereby achieving an improved cooling effect through the second side surface portions of opposite sides of each battery cell of a plurality of battery cell arrays.

According to another exemplary embodiment of the present invention, each battery module may include a first battery cell array and a second battery cell array arranged in the second direction. Each traverse of the battery system may be disposed between the first battery cell array and the second battery cell array. Therefore, the first battery cell array and the second battery cell array are spaced from each other based on the first direction.

According to this exemplary embodiment, at least one second side surface portion of each battery cell of the first battery cell array and the second battery cell array is in thermal contact with the traverses.

In one specific example, the adjacent traverses may be spaced apart from each other by a distance corresponding to the width of the first side surface portion. In other words, two adjacent battery cell arrays are disposed between two adjacent traverses. These two battery cell arrays belong to different battery modules, and are in contact with each other with the traverses therebetween. According to this exemplary embodiment, the packing density of the battery cells in the battery system is further improved, thereby improving the energy density of the battery system.

According to an exemplary embodiment of the present invention, the first battery cell array and the second battery cell array may be connected to each other through a dual module connection unit. In other words, the first battery cell array and the second battery cell array may be electrically and mechanically connected by the dual module connection unit, to be coupled to a dual module. The dual module includes a center gap having a width corresponding to the width of the traverses. The center gap may include a length extending portion that is oriented in the second direction at an installation position of the battery module.

In one specific example, each of the battery cell arrays is assembled through a module frame, which provides mechanical integrity to each battery cell array. Accordingly, each battery cell array may be mechanically and/or electrically assembled as a single unit.

According to another exemplary embodiment of the present invention, at least one side surface portion of each battery cell may be in direct contact with the traverse to be in thermal contact therewith, and the side surface portion may be attached to the traverses. Thus, the thermal contact lasts for a long time, and other mechanical connections between the battery module and the traverses may be omitted or reproduced. Alternatively, at least one side surface portion of each battery cell may contact the battery cells through a thermal pad. Therefore, a swelling phenomenon of the battery cells may be reduced even in a state of being thermally sufficiently connected.

According to another exemplary embodiment of the present invention, the battery system may further include a lower plate disposed at a lower portion of the plurality of battery cells and a system cover disposed at an upper portion of the plurality of battery cells. Each of the lower plate and the system cover may be assembled to the first and second frame beams and/or the traverses.

In one specific example, the lower plate may not include a cooling means, and includes or consists of a heat insulator disposed between the aluminum lower plate and the battery cells, wherein the heat insulator may be disposed in a space between the traverses and the lower plate.

In one specific example, the system cover may include a thin aluminum cover layer, and thermal insulation disposed between the battery cells and the cover layer.

Another aspect of the present invention relates to a vehicle including the battery system according to the exemplary embodiments of the present invention.

In one specific example, the vehicle is an electrically driven vehicle, and electrical energy for driving power is provided by a battery system according to an exemplary embodiment of the present invention.

In one specific example, the battery system may be mounted at a lower portion of a vehicle floor, and does not require much installation space under the vehicle because the battery system is low in height.

Other aspects of the present invention may be apparent from the dependent claims, the accompanying drawings, and/or the description of the drawings.

Advantageous Effects

According to the exemplary embodiment of the present invention, since cooling of the battery cells is performed through the traverses, a cooling means that may be disposed between the lower plate, the system cover, and adjacent battery cells may be omitted. Therefore, since the traverses can mechanically stabilize the system frame and simultaneously cool the battery cells, the battery system of a compact structure having a minimum height and a minimum installation space is provided.

According to the exemplary embodiment of the present invention, the traverses may be coupled between the pair of first frame beams to mechanically stabilize the system frame and to cool the battery cells through thermal contact with the battery cells to provide a mechanical system that is stabilized and compact in structure.

MODE FOR INVENTION

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

Throughout this specification and the claims that follow, when it is described that an element is "coupled/connected" to another element, the element may be "directly coupled/connected" to the other element or "indirectly coupled/connected" to the other element through a third element. In addition, unless explicitly described to the contrary, the word "comprise" and variations such as "comprises" or "comprising" will be understood to imply the inclusion of stated elements but not the exclusion of any other elements.

In addition, as used herein, the term "and/or" includes any plurality of combinations of items or any of a plurality of listed items. In this specification, "A and/or B" may include "A", "B", or "A and B".

The terms "substantially", "about", and the like are used herein to refer to approximations and are not to be used as terms of a degree, and are intended to illustrate the inherent variations in the measured or calculated values recognized by these terms, and such variations are obvious to those of ordinary skill in the art.

In this specification, the terms "upper" and "lower" are defined along the z-axis, and, for example, the system cover is disposed at an upper portion of the z-axis and the ground plate is disposed at a lower portion of the z-axis.

In this specification, the terms "first", "second", "third", and the like may be used to describe various components, constituent elements, and/or sections, but these components, constituent elements, and/or sections should not be limited by these terms. These terms are used to distinguish one component, constituent element, or section from another component, constituent element, or section. Thus, a first component, constituent element, or section described below may be referred to as a second component, constituent element, or section, without departing from the range of the present invention.

Figure 1:
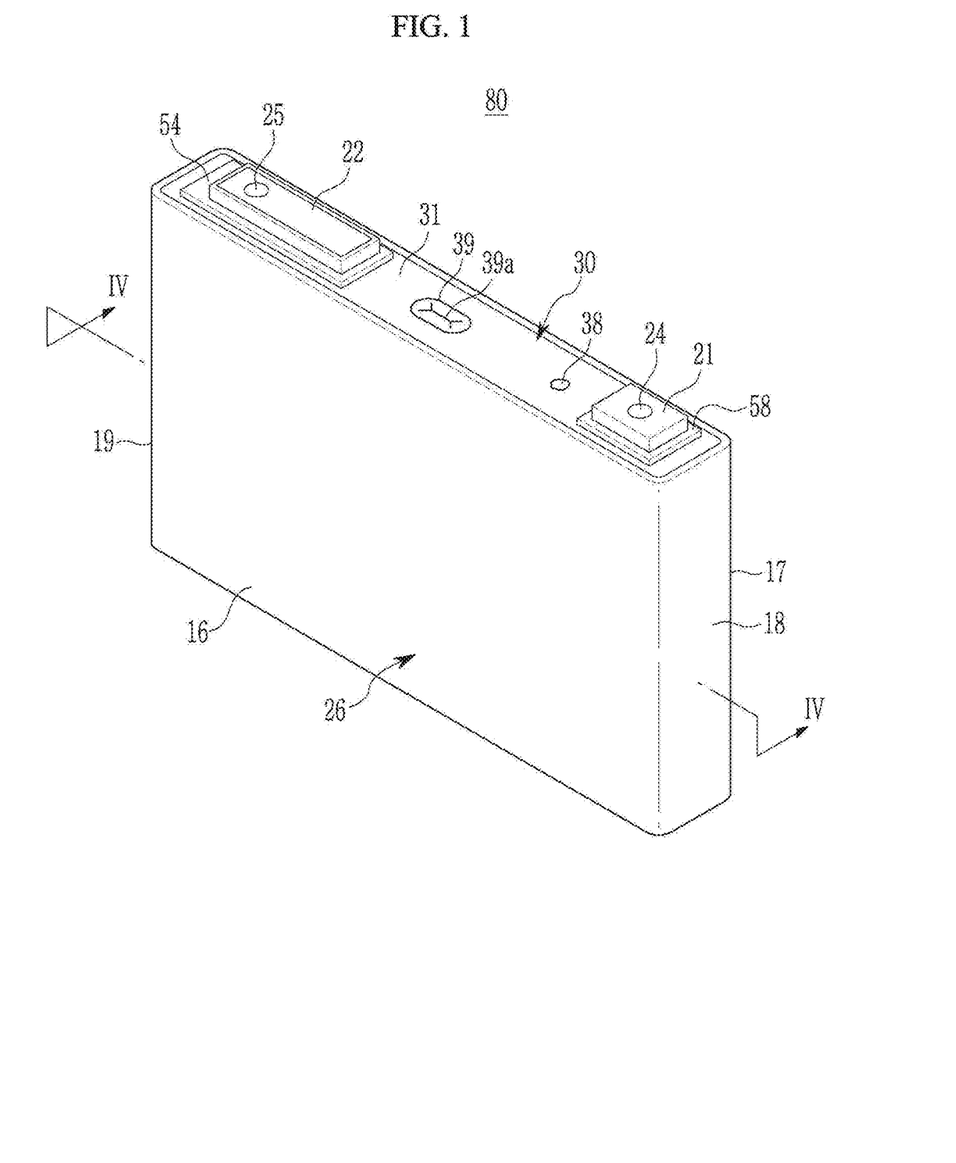
FIG. 1 illustrates a perspective view of a battery cell according to an exemplary embodiment of the present invention.
Figure 2:
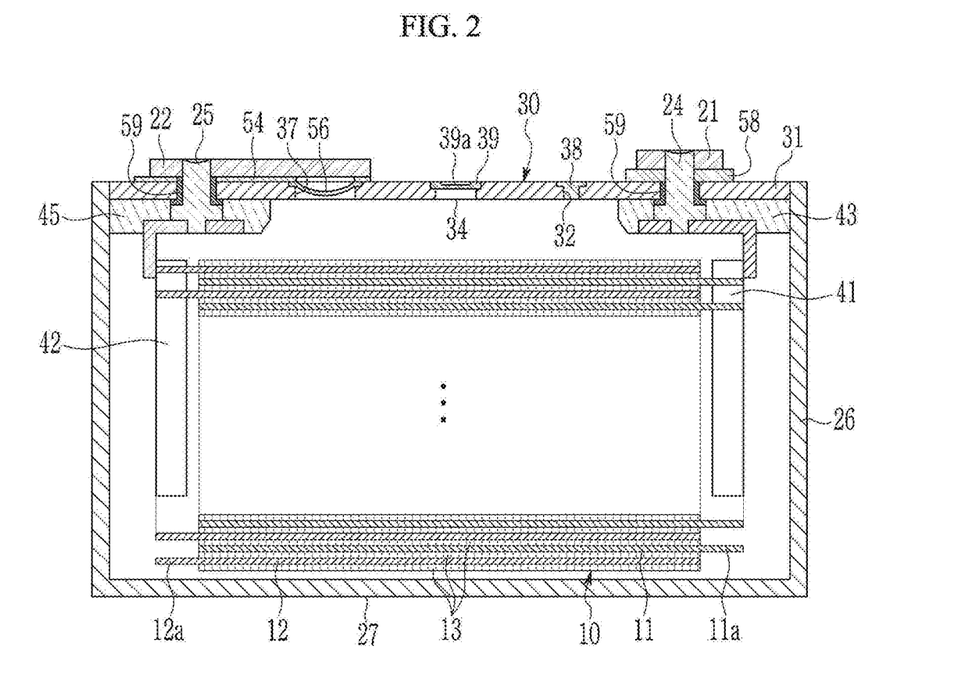
FIG. 2 illustrates a cross-sectional view taken along a line IV-IV of FIG. 1.

FIG. 1 illustrates a perspective view of a battery cell according to an exemplary embodiment of the present invention, and FIG. 2 illustrates a cross-sectional view taken along a line IV-IV of FIG. 1.

Referring to FIG. 1 and FIG. 2, according to the present exemplary embodiment, a battery cell 80 may include an electrode assembly 10 and a case 26 that accommodates an electrolyte solution with the electrode assembly 10. The addition, the battery cell 80 may include a cap assembly 30 for closing and sealing an opening of the case 26. In this specification, the battery cell 80 will be described as a rectangular rechargeable battery cell, but the type of the battery cell is not limited thereto.

The electrode assembly 10 can be formed as a spiral-wound jelly-roll type of electrode assembly including a positive electrode 11 and a negative electrode 12, and a separator 13 interposed between the positive electrode 11 and the negative electrode 12. Each of the positive electrode 11 and the negative electrode 12 may be a collector made of a thin metal foil, and may include a coated region to which an active material can be applied, and a positive electrode uncoated portion 11a and a negative electrode uncoated portion 12a to which no active material is applied.

The coated region of the positive electrode 11 may be formed by applying an active material such as a metal oxide to a substrate formed of a metal foil such as an aluminum foil, and the coated region of the negative electrode 12 may be formed by applying an active material such as carbon or graphite to a substrate formed of a metal foil such as a copper or nickel foil.

The positive electrode uncoated region 11a may be formed at a first side end of the negative electrode 11 in a longitudinal direction thereof, and the negative uncoated region 12a may be formed at a first side end of the negative electrode 12 in a longitudinal direction thereof. The positive electrode uncoated region 11a and the negative electrode uncoated region 12a may be disposed at opposite sides of each of the coated regions. The separator 13 may include a plurality of separators which can be spirally wound after the positive electrode 11, the negative electrode 12, and the separator 13 are alternately disposed.

However, the present invention is not limited thereto, and the electrode assembly 10 may be formed to have a structure including a plurality of sheets in which the positive electrode 11, the separator 13, and the negative electrode 12 are repeatedly stacked.

The electrode assembly 10 may be accommodated in the case 26 together with an electrolyte solution. The electrolyte may be a lithium salt such as $LiPF_6$ or $LiBF_4$ using an organic solvent such as EC, PC, DEC, EMC, EMC, etc., and the electrolyte solution may be in a liquid, solid, or gel state. The case 26 may be formed in a rectangular parallelepiped shape, an opening may be formed on one side of the case 26, and the case 26 may be formed of a metal such as aluminum.

The case 26 may include a bottom surface portion 27 having a rectangle shape, a pair of first surface portions 16 and 17 each of which has a wide side surface, and a pair of second surface portions 18 and 19 each of which has a narrow side surface. The first side portions 16 and 17 and the second side portions 18 and 19 are perpendicularly connected to the respective end portions of the bottom surface portion 27 to form a space for accommodating the electrode assembly 10. The first surface portions 16 and 17 may be formed to face each other, and the second surface portions 18 and 19 may be disposed to face each other and to be connected to the first surface portions 16 and 17. A length of a boundary line connecting the bottom surface portion 27 and the first side surface portions 16 and 17 may be longer than that of a boundary line connecting the bottom surface portion 27 and the second side surfaces 18 and 19, and the first side surface portion and the second side surface portion which are disposed adjacent to each other may form an angle of 90 degrees with respect to each other.

The cap assembly 30 may include a cap plate 31 which is coupled to the case 26 to cover the opening of the case 26, and a positive terminal 21 and a negative terminal 22 that are protruded outward from the cap plate 31 to be electrically connected to the positive electrode 11 and the negative electrode 12, respectively.

The cap plate 31 may have a plate shape extending in one direction, and may be coupled to the opening of the case 26. The cap plate 31 may include an inlet 32 and a vent hole 34 communicating with an interior of the cap assembly 30. The inlet 32 may be configured to inject an electrolyte solution, and a sealing cap 38 may be inserted and mounted into the inlet 32. The vent hole 34 may be provided with a vent member 39 having a notch 39a that can be ruptured by a predetermined pressure.

The positive terminal 21 and the negative terminal 22 may be mounted so as to protrude above the cap plate 31. The positive terminal 21 may be electrically connected to the positive electrode 11 through a first current collecting tab 41, and the negative terminal 22 may be electrically connected to the negative electrode 12 through a second current collecting tab 42. A first terminal connection member 24 for electrically connecting the positive terminal 21 and the first collecting tab 41 may be mounted between the positive terminal 21 and the first collecting tab 41. The first terminal connecting member 24 may be inserted into a hole formed in the positive terminal 21 to allow a lower portion of the first terminal connecting member 24 to be welded to the first current collecting tab 41.

A sealing gasket 59 may be interposed between the first terminal connecting member 24 and the cap plate 31, and may be interposed through a hole through which the first terminal connecting member 24 extends. A lower insulating member 43, which can be inserted into a lower end of the first terminal connecting member 24, may be mounted on a lower portion of the cap plate 31.

A connection plate 58 for electrically connecting the positive terminal 21 and the cap plate 31 may be mounted between the positive terminal 21 and the cap plate 31. The first terminal connector member 24 may be inserted through the connecting plate 58.

Accordingly, the cap plate 31 and the case 26 may be positively charged.

A second terminal connection member 25, which is similar to the first terminal connection member 24, for electrically connecting the negative terminal 22 and the second current collecting tab 42, may be installed between the negative terminal 22 and the second current collecting tab 42. The second terminal connecting member 25 is inserted into a hole formed in the negative terminal 22 to allow a first end and a second end of the second terminal connecting member 25 to be respectively connected to the negative terminal 22 and the second current collecting tab 42.

A sealing gasket 59 similar to the sealing gasket 59 described above may be interposed in a hole through which the terminal connecting member 25 extends, between the cathode terminal 22 and the cap plate 31.

A lower insulating member 45 for insulating the negative terminal 22 and the second current collecting tab 42 from the cap plate 31 may be mounted on the lower portion of the cap plate 31.

An upper insulation member 54 for electrically connecting the negative terminal 22 and the cap plate 31 may be mounted between the negative terminal 22 and the cap plate 31.

The second terminal connection member 25 may be inserted through a hole formed in the upper insulation member 54.

The cap assembly 30 may include a short-circuiting hole 37 and a short-circuiting member 56 installed in the short-circuiting hole 37 to short-circuit the positive electrode 11 and the negative electrode 12.

The short-circuiting hole 56 may be disposed between the upper insulation member 54 and the cap plate 31, and the upper insulating member 54 may have a cutout formed at a position corresponding to the short-circuiting hole 56.

The short-circuiting hole 56 may overlap the negative terminal 22 exposed through the cutout, and may be disposed separately therefrom.

The short-circuiting member 56 may be disposed between the negative terminal 22 and the vent hole 34, or may be disposed closer to the negative terminal 22 than the vent hole 34.

The short-circuiting member 56 may include a curved portion that is convexly formed toward the electrode assembly 10, and an edge portion fixed to the cap plate 31 may be formed at an external circumferential side of the curved portion.

When an internal pressure of the battery cell 80 rises, the short-circuiting member 56 may be deformed to be short-circuited. In other words, when an unnecessary reaction occurs in the battery cell 80 to generate a gas, the internal pressure of the battery cell 80 may increase.

For example, when the internal pressure of the battery cell 80 rises above a certain level and thus the curved portion is concavely deformed in the opposite direction, the short-circuiting member 56 contacts the negative terminal 22 to cause a short circuit.

Figure 3:
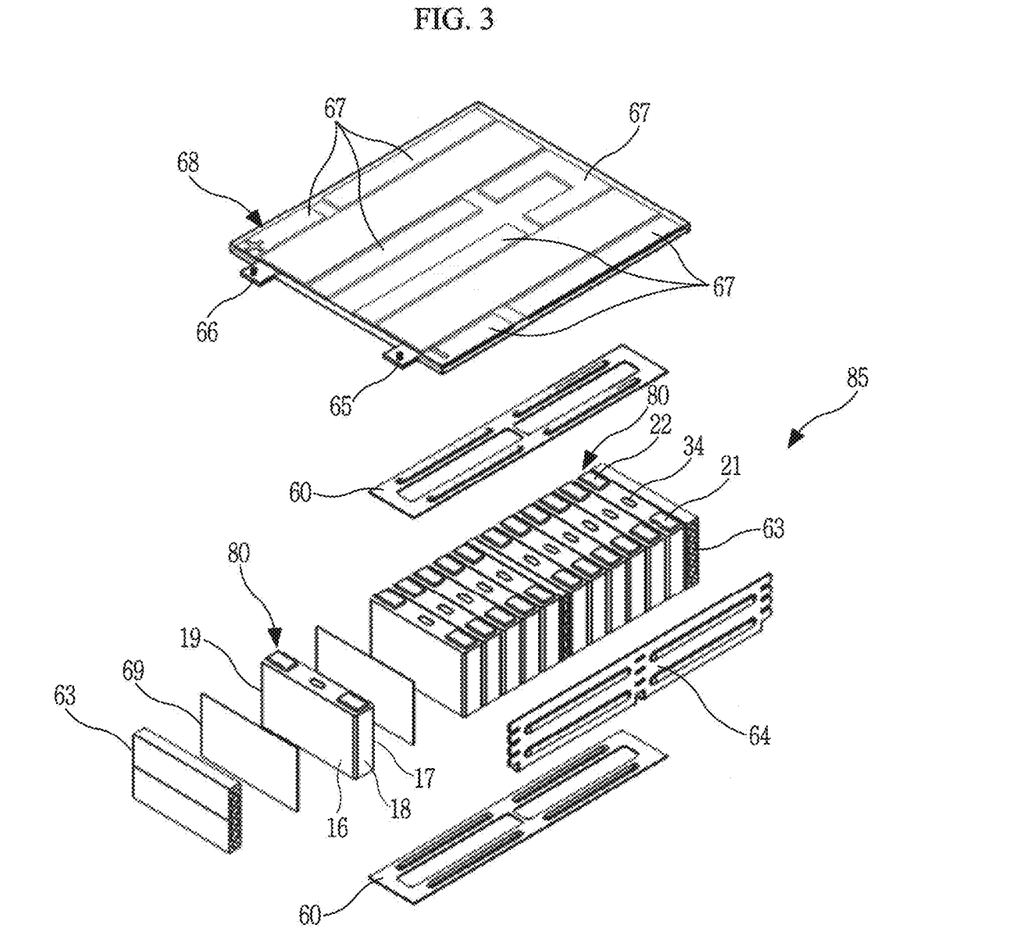
FIG. 3 illustrates a perspective view of a battery cell array constituting a portion of a dual battery module according to an embodiment of the present invention.

Referring to FIG. 3, a plurality of battery cells 80 having a planar shape may be arranged in one direction to constitute a battery cell array 85. In other words, each battery cell 80 of the battery cell array body 85 is arranged such that the electrode terminals 21 and 22 face upward.

In this case, an insulating thin film 69 is disposed between adjacent battery cells 80 in order to avoid unnecessary electrical contact between the individual battery cells 80.

A pair of front plates 63 are disposed to face the wide side surface portions 16 and 17 of each battery cell 80, and a pair of side plates 64 facing the narrow side surface portions 18 and 19 of the battery cells 80 are mechanically coupled to the front plates 63.

A pair of top plates 60 are coupled to the front plates 63 and the side plates 64.

The front plates 63, the side plates 64, and the upper plates 60 constitute a module frame to assemble the battery cell array 85 to provide a mechanically integrated structure to a plurality of battery cell arrays 85.

Figure 4:
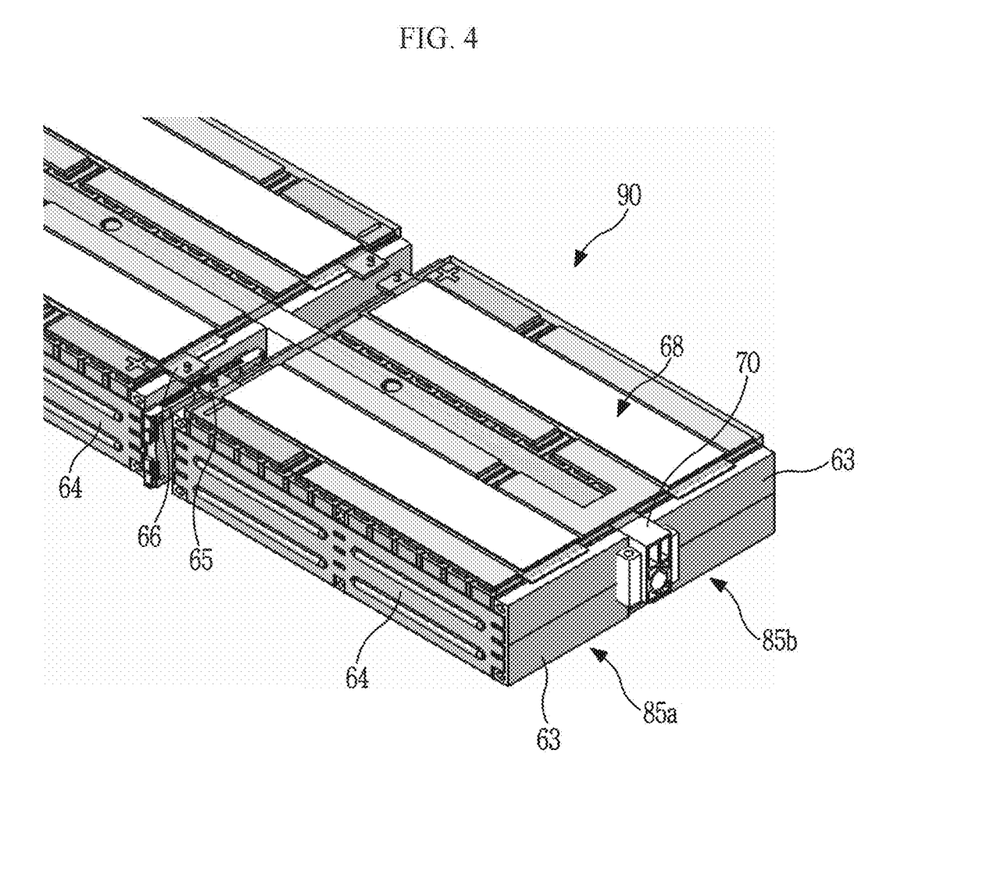
FIG. 4 illustrates a perspective view of a dual battery module assembled in a traverse according to an exemplary embodiment of the present invention.

Referring to FIG. 3 and FIG. 4, a first battery cell array 85*a* and a second battery cell array 85*b* may be electrically connected through one dual module connection unit 68.

According to the exemplary embodiment of the present invention, a battery module 90 may include the two battery cell arrays 85*a* and 85*b*, but the battery module 90 may include one or more than two battery cell arrays 85.

The dual module connection unit 68 may be mechanically coupled to the top plates 60 and the side plates 64 of the two battery cell arrays 85*a* and 85*b*.

The dual module connection unit 68 may include a negative terminal 65, a positive terminal 66, and a plurality of conduction members 67 which are subjected to copper metallization. The conductive members 67 which are spaced from each other are electrically contacted through the battery cells 80. The conductive members 67 are connected to the positive terminal 21 and the negative terminal 22 of each battery cell 80, and connect four battery cells 80 in parallel. Therefore, battery cell bundles formed by the four battery cells 80 are connected in series through the conductive members 67.

Referring to FIG. 3 and FIG. 4, the battery module 90 may include two battery cell arrays 85*a* and 85*b* connected in a 4*p*3*s* shape. Herein, the 4*p*3*s* shape indicates a case where three battery cell bundles including four battery cells 80 connected in parallel are connected in series.

Therefore, according to the present exemplary embodiment, the battery module 90 may have a 4*p*6*s* configuration. The battery module 90 thus formed may be used as a power source, and may have an equivalent voltage of six battery cells 80 and an equivalent current of four battery cells 80, to supply power that is 24 times that of the single battery cell 80. Each battery cell 80 supplies a voltage of about 3.648 V, and the battery module 90 provides a voltage of 21.89 V.

Figure 5:
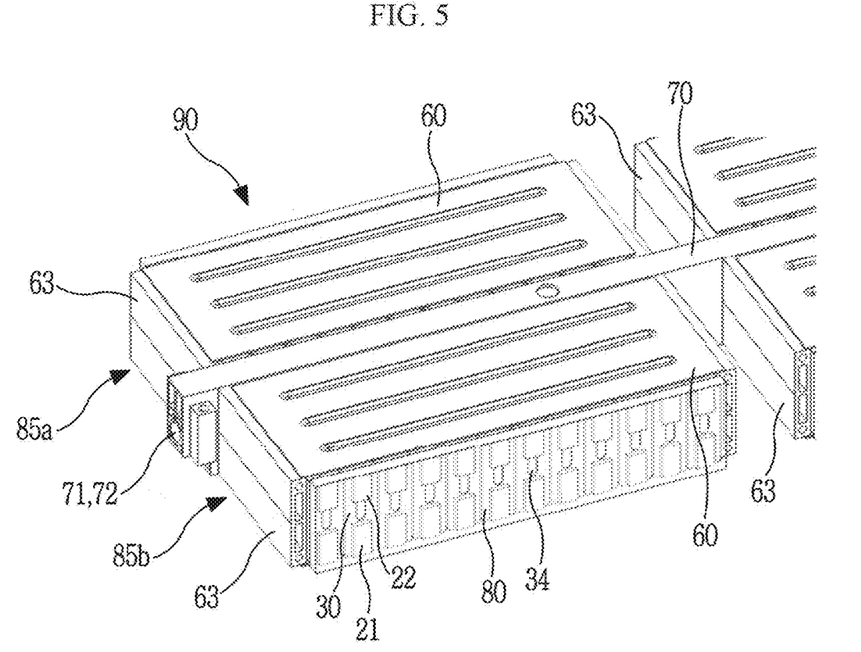
FIG. 5 illustrates a detailed perspective view of a battery module according to an exemplary embodiment of the present invention.

Referring to FIG. 4 and FIG. 5, three battery modules 90 are mechanically connected with one traverse 70. The two battery cell arrays 85*a* and 85*b* are arranged in the second direction, and are electrically connected to each other through the dual module connection unit 68 shown in FIG. 4. The traverse 70 is inserted into a center gap formed between the first battery cell array 85*a* and the second battery cell array 85*b*, to be coupled to the side plates 64 of each of the battery cell arrays 85*a* and 85*b*. Thus, the battery module 90 is mechanically supported by the traverse 70.

Figure 6:
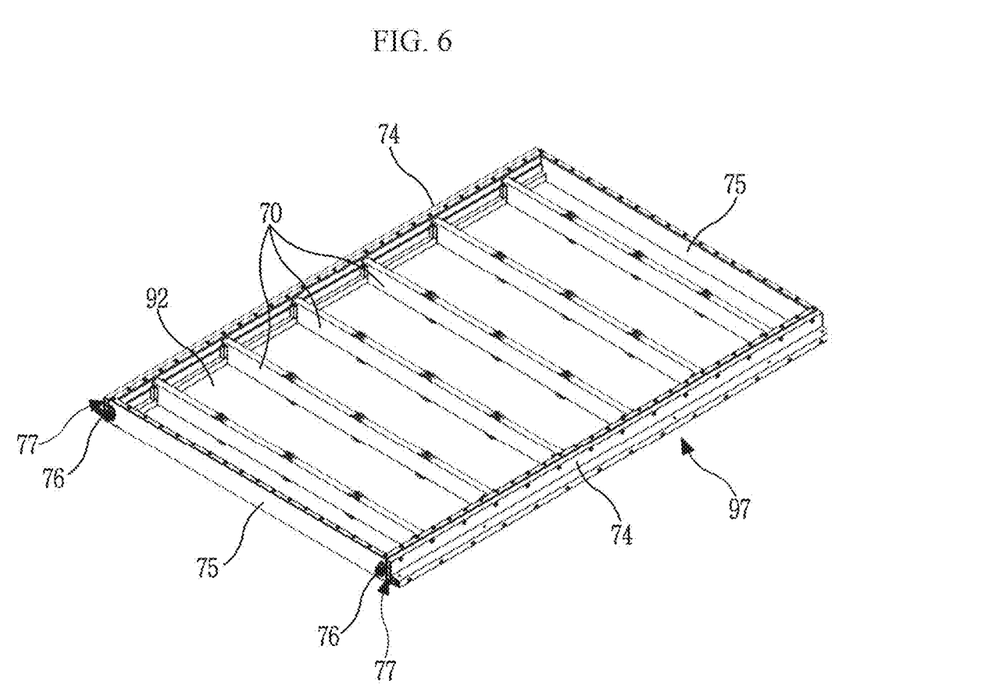
FIG. 6 illustrates a schematic perspective view of a battery module according to an exemplary embodiment of the present invention.

Referring to FIG. 3, FIG. 4, and FIG. 6, each of the battery cells 80 is in contact with the traverse 70 through the second side surface portions 18 and 19 thereof, and the second side surface portions 18 and 19 are perpendicular to the first side surface portions 16 and 17 and are narrower than the first side surfaces portions 16 and 17. Each traverse 70 extends in the second direction at a position where the traverse 70 is installed, to contact the second side surface portions 18 and 19 that are oriented in the first direction (or an opposite direction to the first direction).

According to an exemplary embodiment of the present invention, the traverse 70 has at least the same height as the surface portions 16, 17, 18, and 19 of the battery cells 80, and the electrode terminals 21 and 22 of the battery cells 80 of the battery cell arrays are oriented in an upward direction which is a third direction that is perpendicular to the first direction and the second direction.

Figure 7:
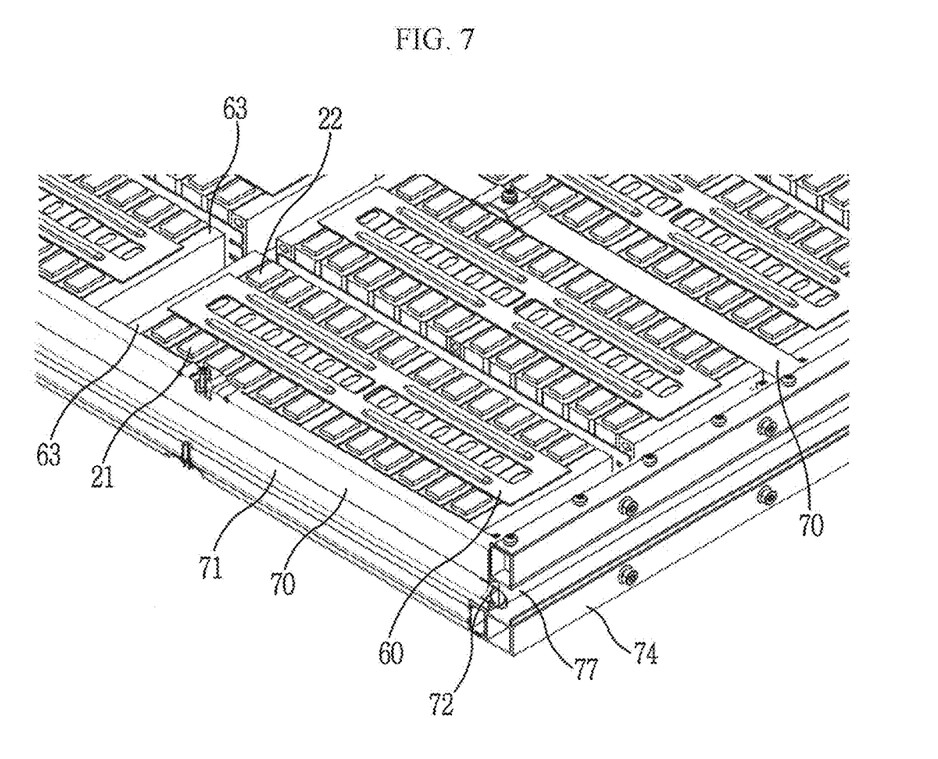
FIG. 7 illustrates a detailed perspective view of a dual battery module assembled in a traverse according to an exemplary embodiment of the present invention.

According to another exemplary embodiment of the present invention illustrated in FIG. 7, each battery cell 80 is in contact with the traverse 70 through the bottom surface portion 27 thereof, the bottom surface portion 27 is disposed at an opposite side to the cap assembly 30, the cap assembly 30 includes the positive terminals 21 and the negative terminals 22 of the battery cells 80, and the positive terminals 21 and the negative terminals 22 are oriented in the first direction in the battery cell arrays 85*a* and 85*b*.

Figure 8:
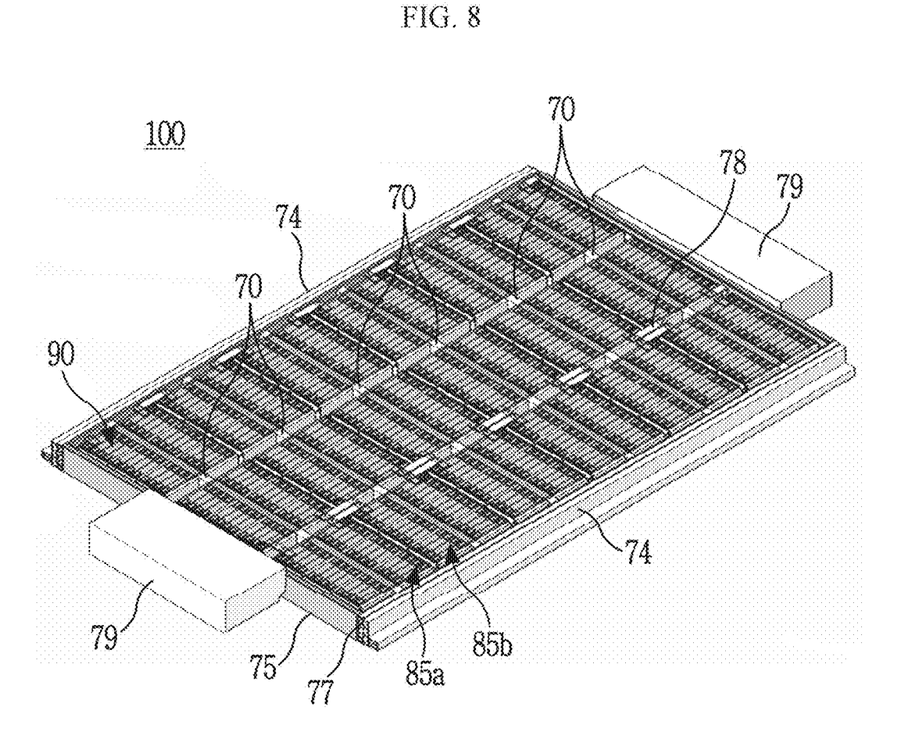
FIG. 8 illustrates a perspective view of a system frame according to an exemplary embodiment of the present invention.

Referring to FIG. 8, each of the traverses 70 may be assembled and mechanically connected to a pair of first frame beams 74. The first frame beams 74 may have an aluminum extrusion profile extending in the first direction, and may be welded to second frame beams 75 extending in a second direction perpendicular to the first direction and having an extrusion profile.

The first frame beam 74 and the second frame beams 75 may constitute a rectangular system frame 97. The plurality of traverses 70 spaced apart in the first direction may extend in the second direction. A distance between adjacent traverses 70 corresponds to a width of the first side surface portions 16 and 17 of the battery cells 80.

Each of the traverses 70 is assembled to the first frame beams 74 within the system frame 97 to reinforce the system frame 97, and although not illustrated in FIG. 8, at least one battery module 90 may be mounted to the traverse 70 before assembling the traverse 70 to the other traverse 70.

Referring to FIG. 8, each of the traverses 70 may be assembled and mechanically connected to a pair of first frame beams 74. The first frame beams 74 may have an aluminum extrusion profile extending in the first direction, and may be welded to the second frame beam 75 extending in a second direction perpendicular to the first direction and having an extrusion profile.

The first frame beams 74 and the second frame beams 75 may constitute the rectangular system frame 97. The plurality of traverses 70 spaced apart in the first direction may extend in the second direction. A distance between adjacent traverses 70 corresponds to a width of the first side surface portions 16 and 17 of the battery cells 80.

Each of the traverses 70 is assembled to the first frame beams 74 within the system frame 97 to reinforce the system frame 97, and although not illustrated in FIG. 8, at least one battery module 90 may be mounted to the traverse 70 before the traverse 70 is assembled to the other traverse 70.

Referring to FIG. 5, FIG. 6, and FIG. 8, the battery system 100 may include the system frame 97 formed by welding the pair of first frame beams 74 and the pair of second frame beams 75 together. Six traverses 70, to which three battery modules 90 are attached, may be mounted on the pair of first frame beams 74. Thus, one of the battery cell arrays 85*a* and 85*b* is arranged at each side of the traverse 70, and the second side surface portions 18 and 19 of each battery cell 80, which constitutes the battery cell arrays 85*a* and 85*b*, may directly contact a side surface of the traverse 70.

Referring to FIG. 5 together with FIG. 3 and FIG. 4, the battery cells 80 may be electrically connected to each other through the dual module connection unit 68, and the negative terminal 65 and the positive terminal 66 of the battery module 90 may be electrically connected to each other through a bus bar 78.

Referring to FIG. 5 and FIG. 6, in a battery system 100, 18 battery modules 90 are connected in series, each battery module 90 may include two battery cell arrays 85*a* and 85*b*, and each of the battery cell arrays 85*a* and 85*b* may have a $4p3s$ structure connected in series with each other. Herein, the $4p3s$ structure indicates a case where three battery cell bundles formed to include four battery cells 90 connected in parallel are connected in series. Accordingly, in the battery system 100, four battery cells 80 are connected in parallel, and 432 (36 battery cell arrays are arranged, and 12 battery cells are connected in series in each battery cell array, and thus 36×12=432) battery cells 80 may be connected in series. Each battery module 90 has a voltage of about 21.89 V, and the battery system 100 including eighteen battery modules 90 may have a voltage of about 394 V.

Referring to FIG. 8, a first E/E box 79 or a second E/E box 79 may be mounted to each of the pair of second frame beams 75 to control the voltage and current of the battery system 100. Each E/E box 79 may be disposed outside the system frame 97, and may include a battery management unit (BMU), a high voltage connector, an input and/or a fuse, a relay, a current sensor, an EMC filter, a free charge relay, and/or a resistor, and/or an HV interface. The battery system 100 may further include a plurality of cell supervision circuits (CSCs) for current measurement and control of the individual battery cells 80 and for balancing the voltage and/or current of the battery cells 80.

Referring to FIG. 6, FIG. 8, FIG. 9, and FIG. 10 together, each of the first frame beams 74 may include a coolant supply line 77 encapsulated in the first frame beam 74 and formed integrally therewith.

Figure 10:
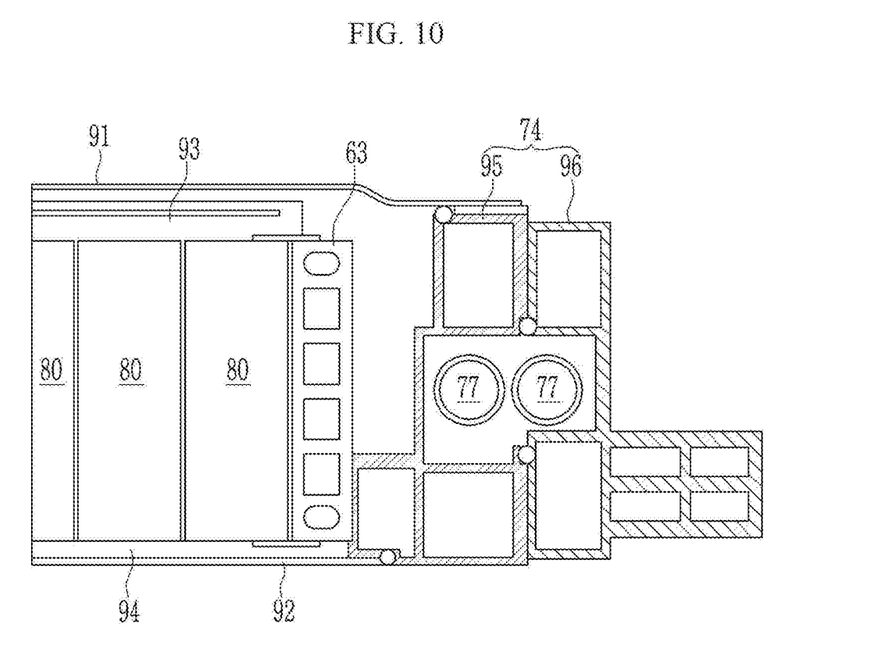
FIG. 10 illustrates a schematic cross-sectional view of an edge portion of a battery system of according to an exemplary embodiment of the present invention.

As illustrated in FIG. 10, the first frame beam 74 may include a first frame beam inner section 95 and a first frame beam outer section 96 assembled together using a fixing means, and thus the coolant supply line 77 may be easily integrated into the first frame beam 74 before the first frame beam inner section 95 and the first frame beam outer section 96 are assembled.

The coolant supply line 77 may be a metal pipe inserted into a hollow between the inner section 95 and the outer section 96 of the first frame.

Figure 9:
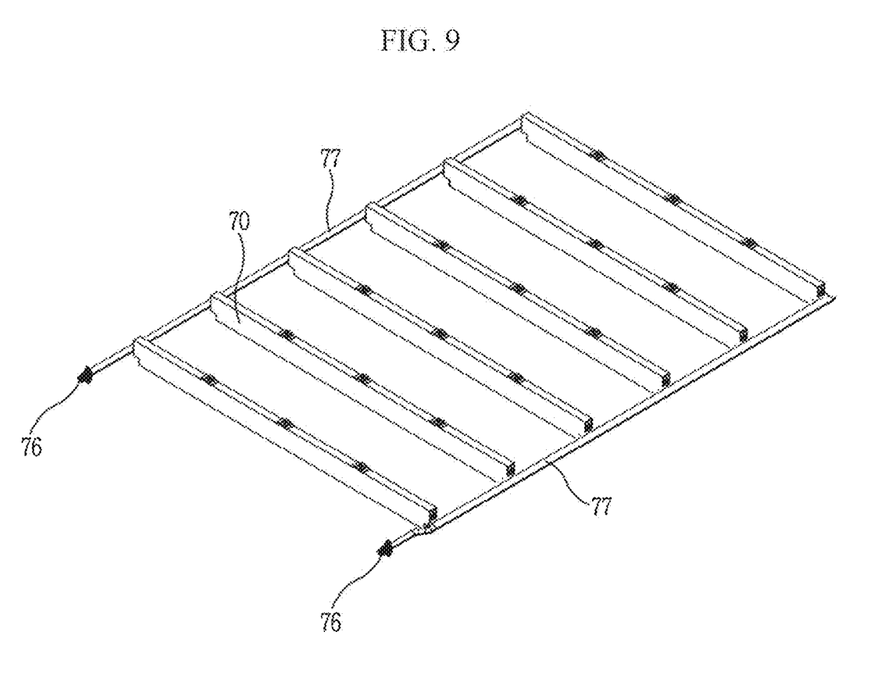
FIG. 9 illustrates a schematic perspective view of a coolant pipe of a system frame according to an exemplary embodiment of the present invention.

As illustrated in FIG. 8 and FIG. 9, the coolant supply line 77 may include a coolant port 76 to be connected to an external coolant circuit.

Referring to FIG. 4, FIG. 6, and FIG. 7 together, the traverse 70 may include an inner coolant duct 71 that passes through an entire length of each traverse 70. The inner coolant duct 71 may be formed as a steel pipe welded within a hollow frame of the extruded aluminum traverse 70.

Alternatively, the coolant duct 71 may be formed by an encapsulated pipeline inserted into a suitable cavity of the traverse 70.

The coolant duct 71 may be connected to the coolant supply line 77 through a coolant distributor 72 disposed at at least at one end of the traverse 70.

Thus, the coolant may be distributed to one of the coolant supply lines 77 of the first frame beam 74 through one of the external coolant circuit and the coolant port 76. Thereafter, the coolant may be distributed to the coolant duct 71 of each traverse 70 through the coolant distributor 72.

The coolant may absorb heat emitted from the battery cells 80, and may absorb heat emitted through the second side surface portions 18 and 19 of the battery cells 80, for example. A cooling means may be omitted in a lower plate 92 by cooling the battery cells 80 through the traverses 70.

As illustrated in FIG. 10, the thin aluminum lower plate 92 may be welded to the system frame 97 under the battery cells 80, and a thin aluminum system cover 91 may be attached to the battery system 100 from an upper portion of the battery cells 80.

A lower insulating member 94 may be disposed between the traverses 70 and the lower plate 92 and between the battery cells 80 and the lower plate 92.

An upper insulating member 93 may be disposed between the battery cells 80 and the system cover 91. Therefore, the battery system 100 having a compact structure with a minimum height and a reduced minimum installation space may be provided.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

10: electrode assembly
11: positive electrode
11a: positive electrode uncoated region
12: negative electrode
12a: negative electrode uncoated region
13: separator
16, 17: first side surface portion
18, 19: second side surface portion
21: positive terminal
22: negative terminal
24: first terminal connection member
25: second terminal connection member
26: case
27: bottom surface portion
30: cap assembly
31: cap plate
32: inlet
34: vent hole
37: short-shorting ball
38: sealing cap
39: vent member
39a: notch
41: first current collecting tab
42: second current collecting tab
43, 45: lower insulating member
54: upper insulating member
56: short-circuiting member
58: connection plate
59: gasket
60: upper plate
63: front plate
64: side plate
65: negative terminal
66: positive terminal
67: conductive member
68: dual module connection unit
69: insulating thin film
70: traverse
71: coolant duct
72: coolant distributor
74: first frame beam
75: second frame beam
76: coolant port
77: coolant supply line
80: battery cell
85a, 85b: first battery cell array, second battery cell array
90: battery module
91: system cover
92: lower plate
93: upper insulating member
94: lower insulating member
95: first frame beam inner section
96: first frame beam outer section
97: system frame
100: battery system

The invention claimed is:

1. A battery system comprising:
a system frame configured to include a pair of first frame beams that extend in a first direction and a pair of second frame beams that extend in a second direction perpendicular to the first direction and that are connected to the first frame beams;
a plurality of traverses spaced apart in the first direction and coupled to the pair of first frame beams; and
a plurality of battery modules respectively coupled to at least one of the traverses and each including a plurality of battery cells arranged in the second direction,
wherein the pair of first frame beams include a plurality of coolant supply lines and at least one of the traverses is connected to the coolant supply lines, and
each of the traverses includes a first cross-section connected to a first frame beam A which is one of the pair of first frame beams, a second cross-section connected to a first frame beam B which faces the first frame beam A, and a coolant distributor that is disposed in at least one of the first cross-section and the second cross-section.

2. The battery system of claim 1, wherein
each of the coolant supply lines is integrally formed with the first frame beams, and
a coolant duct is integrally formed with at least one of the traverses.

3. The battery system of claim 1, wherein
the pair of first frame beams and the pair of second frame beams are welded together as extrusion profiles to form a rectangular-shaped system frame.

4. The battery system of claim 1, wherein
each of the battery cells includes a bottom surface portion and a side surface portion perpendicularly connected to an end portion of the bottom surface portion, and
at least one side portion of each of the battery cells is in thermal contact with the traverse.

5. A battery system comprising:
a system frame configured to include a pair of first frame beams that extend in a first direction and a pair of second frame beams that extend in a second direction perpendicular to the first direction and that are connected to the first frame beams;
a plurality of traverses spaced apart in the first direction and coupled to the pair of first frame beams; and
a plurality of battery modules respectively coupled to at least one of the traverses and each including a plurality of battery cells arranged in the second direction,
wherein the pair of first frame beams include a plurality of coolant supply lines and at least one of the traverses is connected to the coolant supply lines,
each of the battery cells includes a bottom surface portion, a pair of first side surface portions, and a pair of second side surface portions having a smaller width than that of the first side surface portions, and
each of the traverses extends in the second direction to be in thermal contact with the second side surface portions that are oriented in the first direction.

6. The battery system of claim 5, wherein
the traverses are spaced from each other by a distance corresponding to the width of the first side surface portions with respect to the second direction.

7. A battery system comprising:
a system frame configured to include a pair of first frame beams that extend in a first direction and a pair of second frame beams that extend in a second direction perpendicular to the first direction and that are connected to the first frame beams;
a plurality of traverses spaced apart in the first direction and coupled to the pair of first frame beams; and
a plurality of battery modules respectively coupled to at least one of the traverses and each including a plurality of battery cells arranged in the second direction,
wherein the pair of first frame beams include a plurality of coolant supply lines and at least one of the traverses is connected to the coolant supply lines,
each of the battery modules includes a first battery cell array and a second battery cell array arranged in the second direction,
each of the traverses is disposed between the first battery cell array and the second battery cell array, and
at least one side portion of each of the battery cells constituting the first battery cell array and the second battery cell array is in thermal contact with the traverse.

8. The battery system of claim 7, wherein
the first battery cell array and the second battery cell array are connected to each other through a dual module connection unit.

9. The battery system of claim 7, wherein
each of the battery cell arrays is assembled through a module frame.

10. The battery system of claim 4, wherein
at least one side portion of each of the battery cells is in direct contact with the traverse.

11. The battery system of claim 4, wherein
a thermal pad is disposed between at least one side portion of each battery cell and the traverse.

12. The battery system of claim 1, further comprising
a lower plate disposed at a lower portion of the battery cells and a system cover disposed at an upper portion of the battery cells.

13. A vehicle comprising the battery system according to claim 1.

14. The vehicle of claim 13, wherein the battery system is mounted to a lower portion of a vehicle floor.

* * * * *